Oct. 5, 1943.  G. SLAYTER  2,331,146

METHOD OF FELTING GLASS FIBERS

Original Filed Dec. 24, 1936   3 Sheets-Sheet 1

INVENTOR
George Slayter
BY
ATTORNEY

Oct. 5, 1943.     G. SLAYTER     2,331,146
METHOD OF FELTING GLASS FIBERS
Original Filed Dec. 24, 1936      3 Sheets-Sheet 2

INVENTOR
James Slayter
BY
ATTORNEY

Patented Oct. 5, 1943

2,331,146

UNITED STATES PATENT OFFICE 2,331,146

METHOD OF FELTING GLASS FIBERS

Games Slayter, Newark, Ohio, assignor, by mesne assignments, to Owens-Corning Fiberglas Corporation, a corporation of Delaware Original application December 24, 1936, Serial No. 117,589, now Patent No. 2,206,059, dated July 2, 1940. Divided and this application January 6, 1940, Serial No. 312,731

14 Claims. (Cl. 154—28)

The present invention relates to a method of felting glass fibers and more particularly to such a method for interfelting the fibers of a mass of glass wool that has been wound in sheet or blanket form on a mandrel preparatory to forming an insulating pipe covering.

This application is a division of my co-pending application, Serial No. 117,589, filed December 24, 1936, for Fibrous glass felt, now Patent Number 2,206,059 of July 2, 1940.

Still more specifically, the invention relates to a novel method for forming an interfelted mass of glass wool on a mandrel in such a manner that the individual fibers, which because of their original long and fine nature inherently tend to lie parallel to a particular plane or surface upon which the fibers are accumulated, are caused, nevertheless, to partially depart from this inherent parallelism and interfelt throughout the mass of glass wool, to the end that the mass may attain mass integrity and tensile strength in all directions including directions transverse to the original surface of inherent parallelism.

An object of the invention is to produce a substantially cylindrical interfelted product of glass wool having not only mass integrity and tensile strength in all directions but which is high in heat resisting and heat insulating quality. In order to procure a high insulating value from such a product having long fibers, it has been found advantageous to lay the fibers predominantly transverse to the radial direction of heat flow. When the fibers are laid transverse to the direction of heat flow, the heat is prevented from flowing through the mass with the same ease as when the fibers are laid parallel to the direction of heat flow. It is an object, therefore, to provide a product in which the longer fibers predominantly do not lie in the radial direction of heat flow but have their major components extending in directions transverse to the direction of heat flow.

Another object of the invention is to provide a cylindrical mineral wool mass having the foregoing characteristics which is flexible and resilient, so that when walked on or otherwise compressed or flexed, it will yield but will spring back substantially to its former shape and position when released. The so-called masses of mineral or rock wool heretofore and at present in general use, have serious objections as they lack the desirable features above noted which characterize the present invention. Such masses are generally a molded product and in view of the shortness of the fibers derive substantially all of their strength from the binding material. As a result, these products are solid, rigid and inflexible. When such material is stressed or bent, solid portions of it crack off and break away, and when the material is walked on or compressed, the mass merely crumbles and cannot resume its former shape or position. Moreover, in forming pipe covering of this material, the product has to be formed into two separate solid blocks which are generally hinged together along their longitudinal edges. If one of these halves is bent open, the material refuses to flex but merely breaks off in large pieces. An aim of the present invention is to overcome the above noted objections and difficulties and produce a felted mass which may be flexed and bent to a reasonably high degree and which does not crack off into large pieces.

Another object of the present invention is to provide an interfelted, bonded substantially cylindrical mass of glass wool of light density, the density being of the order of magnitude of about 3 to 12, and preferably about 5 to 7 pounds per cubic foot, and having great strength although replete throughout with a multiplicity of dead air spaces.

Another object of the invention is to provide a felted mass with the foregoing characteristics, having a predetermined shape and size, depending on the particular use to which it is to be put, as, for example, pipe covering, stove or refrigerator insulation, wall boards or the like.

Another object of the invention is to provide a felted mass of the foregoing characteristics in which a large portion of the glass fibers may remain long and reticulated and mutually interlaced and extending in all directions.

A further object of the invention is to produce pipe coverings of the foregoing characteristics having various binders suitable for various specific uses and in particular for use as a high temperature heat insulation product.

A further object of the invention is to provide methods of interfelting a conventional glass wool mat having long fibers in substantial parallelism, the said methods producing an interfelting without causing the mass to tear apart or become weak or infirm, and without causing the individual fibers to break up into a mass of short fibers such as conventional rock wool or the like.

Other objects and advantages of the present invention will become apparent from the following description taken in conjunction with the accompanying drawings, in which.

With reference to conventional methods of making insulating material of the general type hereinbefore mentioned, when short hairy fibers are used in the initial formation of the blanket which is to be wound on a mandrel to produce a pipe covering such as those produced in the common rock wool or mineral wool operations, the fibers are commonly so short that it is impossible for them to interlace and mesh with one another to produce substantial mass integrity and inherent strength. As a consequence, when such materials are wound upon a mandrel for the purpose of producing a pipe covering the wound mass inherently lacks mass integrity and tensile strength in a circumferential direction so that the pipe covering cannot be subjected to tortional stresses.

One of the features of the present invention is the production of insulating material comprising a cylindrical mass of long mineral wool or glass fibers which lie predominantly in a direction transverse to the radial direction of heat flow through the material but in which a large portion of the fibers have departed from parallelism with said direction and have been caused to interweave and interlace with the other fibers. There is thus produced a felted mass having strength and mass integrity in all directions including the circumferential transverse direction. Another feature of the present invention is the production of a heat insulating material which, while being interfelted, is, nevertheless, laminated to such a degree that it possesses a high degree of flexibility, yieldability and strength in all directions and also possesses a high degree of insulating value.

Another feature of the present invention relates to a process of felting a mat in which there is produced a series of progressive creeping movements between the inner and outer surface portions of the mat, the movements being more or less in the direction of the surface of inherent parallelism. When layers of fibers parallel to a particular surface are juxtaposed and then caused to slide upon one another in a particular direction for a short distance, the fibers of each of these layers tend to interfelt and depart to a certain extent from the initial parallelism. If these layers are again given another short relative movement, they are permitted to further interfelt and further depart from their initial parallelism to the surface. If the individual movements, however, are excessive, the mat is merely torn apart without accomplishing the desired purpose. Mere agitation without intelligent guidance, therefore, is not sufficient. As these movements or impulses are repeated for a sufficient number of times, it is possible to cause a thorough interfelting, which we have so termed, having in mind a mass of fibers interlaced and extending in all directions including directions transverse to the original inherent directions of parallelism.

I have found that while repeated movements or impulses cause an interfelting action, it is generally preferable to produce these movements or impulses in the same direction or in more or less the same effective direction as brought out more fully hereinafter. When laminations or layers of fibers arranged concentrically are juxtaposed to one another and caused to slide upon one another in a particular direction for a short distance, the fibers of each of the laminations tend to interweave, interfelt and depart from the initial parallelism. If these laminations are then moved back again to their original positions, the individual fibers tend in part to resume their initial positions and regain substantial parallelism to the principal surface.

However, if successive impulses are given to the juxtaposed laminations in the same direction or at least in the same effective direction, as brought out more fully hereinafter, the fibers do not resume their original positions but continue to interfelt and intertwine and depart to a predetermined degree from the original parallelism. The result is that the original laminations are caused to be interfelted and a certain portion of the juxtaposed fibers are caused to intertwine and increase the mass integrity of the cylindrical mass in the direction transverse to the original circumferential direction of parallelism. However, the fibers, and particularly the longer fibers, remain predominantly in directions approaching more or less closely, their original parallelism so that the original laminations are not necessarily entirely removed and the benefits derived from arranging the major portion of the fibers and particularly the longer ones transverse to the heat flow, are retained. Many of the shorter fibers thus extend in directions transverse to the major faces of the cylindrical mass and thus serve to add strength in these directions leaving longer fibers principally lying in planes parallel to the major faces, and serving to retain the strength of the mass in these directions.

The successive impulses or short relative movements in the same direction between two adjacent laminations may be produced by several methods, according to the product which may be desired, as brought out more fully hereinafter.

Another important feature of the present invention is the discovery that the use of a large amount of water or other suitable liquid throughout the mass of fibers materially assists in the interfelting action. For this purpose I preferably drench the fibers with a large amount of binder solution prior to the interfelting action. The liquid performs two principal functions, (1) it lubricates the fibers and permits them to slide past one another during the interfelting action, and (2) the forcible removal of the liquid from the fibrous mass, as, for example, by centrifugal force, causes displacement of the fibers from their original orientation. Thus, the mere fact that the fibrous mass has been drenched with a suitable liquid facilitates the interfelting and consequently increases coherence of the mass as a whole.

The liquid, which may be caused to fill the interstices between the fibers originally, may weigh as high as ten or more times as much as the fibers, owing to its heavy concentration throughout the mass. As the liquid is removed from the mass of fibers either by centrifuging, suction, or other suitable means, it causes the fibers and particularly the shorter fibers, to be displaced from their original position and approach an alignment in the direction of removal of the water. When the liquid is removed in the direction transverse to the original inherent parallelism, the fibers tend to align themselves in the transverse direction and thus facilitate an interfelting of the mass.

In carrying out my invention it is possible to produce articles of cylindrical or curved form for various uses such as pipe covering or the like.

Figure 1:
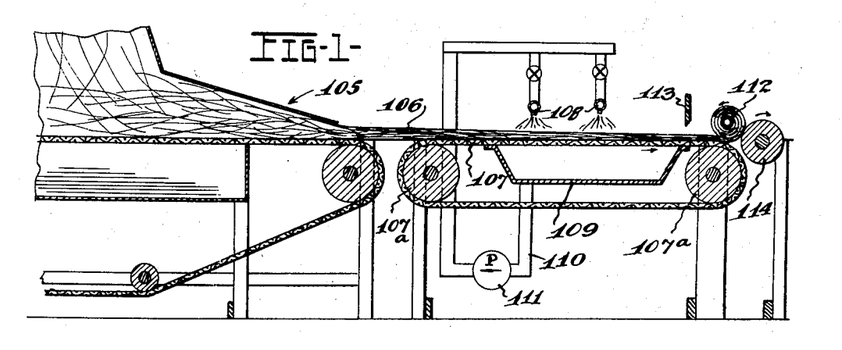
Fig. 1 is an elevational diagrammatic view of an apparatus for forming a glass wool mat and means for intermixing a suitable binder therewith and then rolling said mat upon a mandrel or the like, preparatory to the interfelting action.
Figures 2, 3:
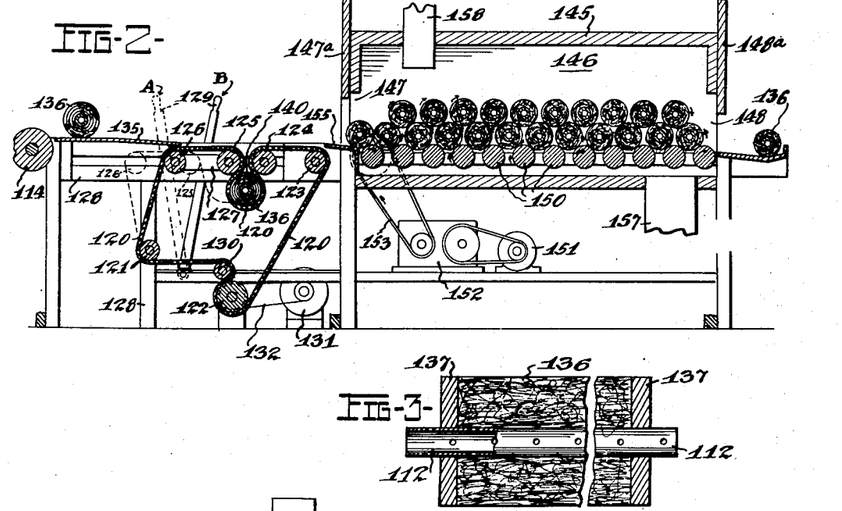
Fig. 2 is a diagrammatic elevational view shown partly in section of a means for interfelting a pipe cover or insulation roll and an oven for drying and causing the interfelted mass to solidify in permanent formation.
Fig. 3 is a longitudinal cross-section of a pipe covering of glass upon a mandrel showing details for permitting it to be reduced to a predetermined size.

Referring now to Figs. 1 to 3, I have illustrated an apparatus adapted to form an interfelted mass of glass fibers in a cylindrical form suitable for pipe covering or the like. In the drawings, reference character 105 designates generally an apparatus for forming a mat 106 of glass wool or similar material. The apparatus 105 may be similar to that illustrated in Fig. 1 of my copending application above referred to. In manufacturing pipe covering, I have found it preferable to form a mat of glass wool, which is relatively thin, and build layers of these mats spirally upon a mandrel. In so doing I have achieved a product which possesses great elasticity, flexibility, strength and also lightness in density. The density is preferably of the order of about 3 to 12 pounds per cubic foot, but it may be produced within a much wider range.

In order to convey the mat 106 from the forming machine, I proved a belt 107 running over rolls 107a. Above the mat 106 are spray nozzles 108 which serve to soak the mat with an abundance of dilute binder solution. The excess binder drips from the mat and through the belt 107 if it is foraminous, and passes into a receiving trough 109 arranged below the belt 107. A conduit 110 leading out from the trough 109 and a pump 111 associated therewith, serve to return the excess binder solution to the spray nozzles 108. At the discharge end of the conveyor belt 107, the mat 106 is rolled upon a mandrel 112 to the desired thickness, after which it is cut off by suitable means such as knife 113. A driven drum 114 may be provided to assist in the rolling operation of the mat on the mandrel 112.

The binder which is added to the mat prior to its being wound upon the mandrel 112 is preferably a dilute solution say, 1 to 10% of a material such as starch, bentonite, casein, dextrin, agar agar, gelatin, rubber or rubber derivatives, asphaltic compounds and the like having volatile constituents adapted to be driven off during the heating operation, and various other similar materials. If desired a solution of a synthetic or other resin, as for example, Bakelite, may be employed and in the subsequent heating operation polymerization may be relied upon rather than evaporation or volatilization for the curing or hardening effect.

Instead of utilizing a spraying process, a dip section may be employed. The binder may also be applied to the fibers in the forming hood during the initial formation or attenuation of the same.

Fig. 2 illustrates spinning or interfelting means and a drying element. The spinning means comprises a foraminous belt 120 which is passed over stationary rolls 121, 122, 123 and 124 and over movable rolls 125 and 126, these latter being mounted together upon a reciprocable horizontal slide 127. The belt 120 also passes around a roll 130 which serves as an adjustable take-up roll, the amount of take-up being determined by the particular length of the belt. The slide 127 is mounted upon a frame 128 upon which are also mounted the stationary rolls 121, 122, 123 and 124 over which the belt 120 travels.

A handle or lever 129 or other actuating means may be provided for the slide 127 to move it into or out of operative position. The operative position noted as B on the drawings for the slide has been shown in solid outline and the inoperative position A of the slide has been shown in dotted outline. The belt 120 is driven at any desired speed which may vary from a few feet to about 3,000 ft. per minute, although I have found it preferable to drive it at a speed of about 300 to 1,000 ft. per minute for about 500 times. The driving means may consist of a motor 131 which is connected with the roll 122 by means of a drive belt 132 and accompanying pulleys.

A table 135 is preferably provided between the roll 114 and the roll 126, this table 135 serving to feed the pipe covers 136 into the apparatus.

The cylindrical pipe cover 136 is preferably provided at each end thereof with a collar or spacer 137 (see Fig. 3), the purpose of these collars being more fully brought out hereinafter.

In starting the operation the holder 129 is pulled over to position A, at which position the rolls 124 and 125 are spaced apart and the belt 120 hangs limply therebetween. The roll 136 is then fed into the loop in the belt between these rolls and then the handle 129 is pulled over to position B to cause the belt 120 to encircle the pipe cover 136.

When the roll 125 has been pulled into operative position B, the belt is started and revolves the pipe cover 136, preferably at high speeds, thereby causing the binder solution within the glass wool mat to be distributed over the fibers, particularly at their points of intersection, and the excess to be thrown out centrifugally.

The centrifuging performs the further important function of interfelting the juxtaposed layers of the glass wool mat. It will be noted that before the centrifuging operation, the pipe cover 136 was made up of a series of layers of glass wool fibers, all of which contained fibers lying substantially parallel to the outer cylindrical surface, and so that the pipe cover 136 could readily be unrolled to its original mat formation or the fibers otherwise lifted off layer by layer. However, after the centrifuging operation, the adjacent fibers from juxtaposed laminations of the glass wool mat are caused to depart to a certain extent from the original parallelism and interweave with one another, whereby the strength and mass integrity of the matted roll are materially increased.

The interfelting action is facilitated to a large extent by the successive revolutions of a node or swelling 140 (Fig. 2) which appears in the pipe cover 136 between the rolls 124 and 125 during the rolling action. A portion of the glass wool is forced up between these rolls to form the node and, in revolving around the pipe cover, the outer layers of fibers are caused to advance forward relative to the inner layers of glass fibers, whereby they are given successive relative movements in the same direction.

In this connection it will be noted that the rotation of the node should be in the same direction in which the mat has been wound upon the mandrel. This is easy to arrange, however, by originally placing the pipe cover 136 onto the belt 120 in the correct position. If the roll is placed in the incorrect position, the spirally wound mat tends to unwind and be destroyed.

The spacers or collars 137 (see Fig. 3) at each end of the roll 136 enable the compacting of the glass wool mat to be carried on to a predetermined degree and also facilitate the production of a more or less perfect cylindrical surface. The collars 137 may be made of wood, metal or other suitable material and may be fitted onto the mandrel in any suitable manner.

After the interfelting action, the collars 137 may be removed and the pipe covers 136 are then placed in a drier or oven 145 which will now be described. The oven consists of a chamber 146 having a charging opening 147 at one end and a discharge opening 148 at the other end, each opening being provided with a sliding gate 147a and 148a, respectively, which serves to seal in the heat within the chamber.

Overlying the floor of the chamber 146 are a series of spaced apart parallel rollers 150, all of which are rotated in the same direction so that the upper portions thereof are advancing toward the discharge end. The rollers 150 may be driven by any suitable means such as a motor 151 which may be mechanically connected with the rollers 150 by means of a speed change gear box 152, power belt 153 and suitable gear or belt mechanism (not shown) interconnecting the individual rollers 150. In proximity to the charging opening 147 is a table or chute 155, this chute serving to introduce the individual pipe covers 136 after they have been interfelted and left the spinning mechanism.

A predetermined temperature and humidity may be maintained in the chamber 146 by passing a flow of air therethrough, preferably in a counter-current direction with the movement of pipe covers 136. For this purpose a hot air inlet 157 may be provided near the discharge end of the chamber 146 and an air outlet 158 may be provided near the inlet 157.

The rolls 136 are introduced into the chamber through the inlet 157 and seat themselves between adjacent rollers 150. As the pipe rolls rest between the adjacent rollers 150 they are given a rotary motion in a direction shown by the arrows in the drawings. The revolving of the rolls which is generally done at a relatively low speed, serves to maintain an even distribution of binder throughout the pipe covering and prevents a seepage of the binder to any particular point or side.

In loading the pipe covers 136 into the oven, it is possible to pile them up into successive rows, the covers of each row, of course, rotating in the direction opposite the direction of rotation of the covers in the adjacent rows. In order to advance the pipe covers 156 through the oven, it is merely necessary to advance the first cover nearest the charging end 147 and cause it to bump against the next succeeding pipe cover. This next cover then advances automatically to the next succeeding space and causes in turn its next succeeding pipe cover to advance one more space. This successive advance of positions occurs very rapidly throughout the oven. In other words, by moving the first cover, all of the covers in order are advanced to the next succeeding position, and the last covers 136 in the oven are caused to fall out of the discharge end 148.

The continual rolling of the pipe covers 136 on the rolls 150 within the oven also assists in producing a smooth, tough and finished surface on the individual pipe covers. As the solvent of the binder or other liquid therein evaporates and is carried off through the outlet 158, the binder hardens and produces a stiff, flexible and strong product having a tough, coherent surface.

After the solvent or other liquid in the binder solution has dried, a relatively small amount of residual binder remains in the pipe cover to serve as a binding agent. I have found that a small amount remaining, such as 2 or 3%, compared to the weight of the glass fibers, is generally sufficient to form a strong, coherent and interfelted mass which also has the advantage of flexibility and yieldability under pressure. The amount of binder left in the cover is dependent upon the original concentration of binder solution, the amount of solution applied and the degree of centrifuging.

Figure 4:
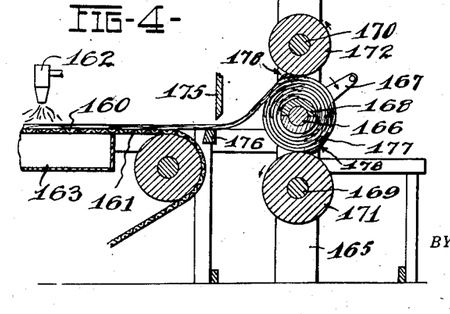
Fig. 4 is a diagrammatic elevational view of a modified form of the interfelting means.

Referring to Fig. 4, I have illustrated a modification of the spinning apparatus illustrated in Fig. 2. In this embodiment a mat of glass wool 160 is illustrated being carried upon a belt 161. Mounted over the mat 160 is a spray nozzle 162 adapted to soak the mat with a dilute binder in the same manner as illustrated in Fig. 1. Underlying the belt 161 is an outlet trough 163 adapted to receive the excess binder solution which may drip through the belt 161 from the mat 160. Mounted near the discharge end of the belt 161 is a frame 165 upon which is mounted a horizontally disposed shaft 166 which may be turned by a crank 167 or other suitable means. On the shaft 166 is mounted a split mandrel 168. The frame 165 also holds horizontally disposed shafts 169 and 170 upon which are mounted rolls 171 and 172 respectively. A knife blade 175 and a coacting block 176 are preferably arranged near the discharge end of the belt 161 and serve to sever predetermined lengths of the mat 160.

In the operation of this device, the mat 160 is laid over the mandrel 168 and then wound up thereon by turning the crank 167. After a predetermined length of mat 160 has been wound upon the mandrel, the mat is severed by means of the knife 175. The rolls 171 and 172 are adapted to rest yieldingly with a predetermined pressure against the pipe cover 177 and assist in an interfelting of the adjacent layers of the mat 160 which composes the pipe cover 177. After a predetermined number of turns of the pipe cover 177, it is removed from the mandrel 168 and then placed in a suitable drying oven such as, for example, that disclosed in Fig. 2, to dry and harden the binder.

The interfelting of the adjacent layers of mat 160 is performed in a manner similar to that of the other embodiments of the present invention. The contacting rolls 171 and 172 press upon the cover 177 with a predetermined pressure and serve to provide a number of successive relative movements between the concentric layers of the mat, all of these movements preferably being in the same direction. In this embodiment, as in the other embodiments, a node or slight swelling 178 is formed in front of each of the rolls 171 and 172, these nodes 178 assisting in the interfelting action as pointed out hereinabove with the other embodiments.

Figure 5:
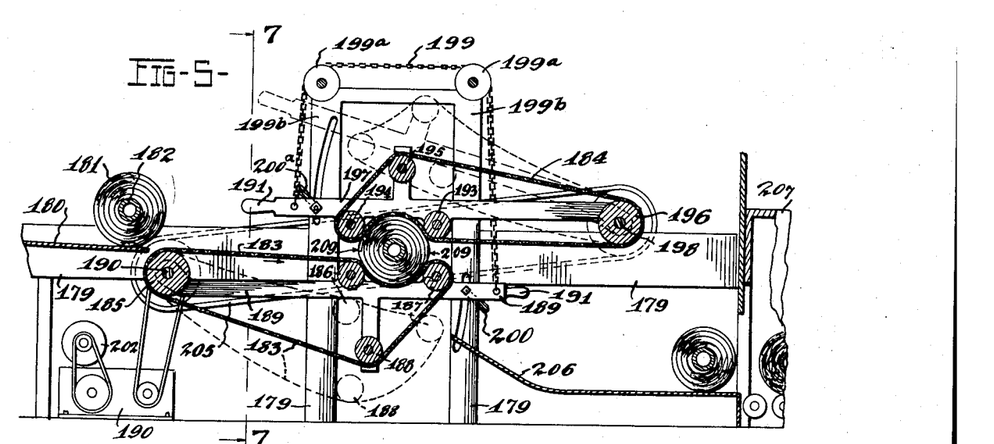
Fig. 5 is a sectional diagrammatic and elevational view of a further modification of an interfelting means.
Figures 7, 8:
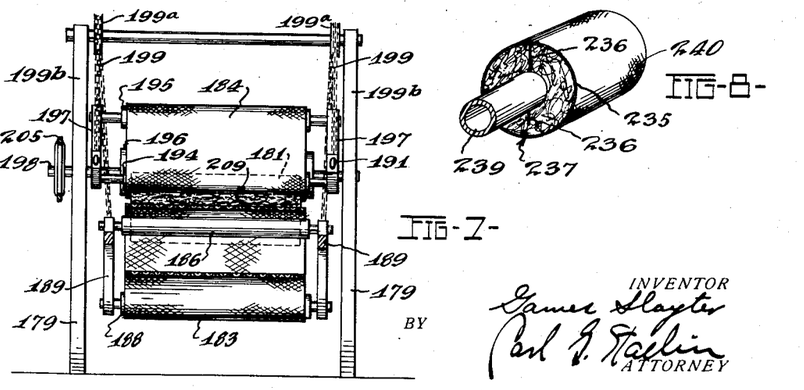
Fig. 7 is a sectional end view of the embodiment shown in Fig. 5, the section being taken along line 7—7 of Fig. 5.
Fig. 8 is a sectional perspective view of a pipe cover shown in place over a pipe.

Referring now more particularly to Figs. 5 and 7, I have shown another embodiment of the present invention, this embodiment being similar in certain respects to that illustrated in Fig. 2. Instead of having one belt encircling the cylindrical pipe cover, this modification contemplates providing two coacting belts, each of which covers a portion of the pipe cover.

More particularly in regard to this embodiment, the apparatus is mounted upon a stationary base 179 at one end of which is a feed table or chute 180. This chute 180 serves to feed pipe covers 181 composed of a glass wool mat rolled spirally upon a mandrel 182. These may be formed and soaked with binder in a manner similar to that illustrated in Fig. 1. The interfelting device comprises two coacting belts 183 and 184, each covering a portion of the pipe cover. The former is driven over four drums or rolls, 185, 186, 187 and 188, which are shown in the drawings in solid outline in operative position and in dotted outline in inoperative position. These rolls are all mounted upon a pivoted frame 189 which pivots about a shaft 190 upon which the drum 185 rotates. The frame 189 is provided with a handle 191 which permits it to be moved into operative or inoperative position as desired and a locking means 200 adapted to lock the frame to the base 179 in the desired position.

The belt 184 is placed diametrically opposite to the belt 183 and is driven around the parallel rolls or drums 193, 194, 195 and 196, all of which are mounted upon a movable frame 197 which may be oscillated about a shaft 198 over which the roll or drum 196 is mounted. The arrangement of the rolls 193 and 194 is such that in operative position, they are directly over and in register with the rolls 187 and 186 respectively.

In order to hold the frame 197 into position, it has been counter-balanced with the frame 189. For this purpose a chain 199 running over the pulleys 199a, which in turn are mounted on extensions 199b of the base 179, has been provided to connect extremities of frames 197 and 189 respectively. Locking means 200a have also been provided to maintain the frame 197 in its position. It will be noted that with this arrangement a movement of frame 189 causes a corresponding movement of frame 197 into operative or inoperative position, as desired.

Driving means such as a motor 202, may be provided for the belts 183 and 184 and driving connection may be made thereto by means of a speed change gear box 190, and drive belt 205, the latter interconnecting the shaft 190 with the shaft 198. In this manner the belts 183 and 184 are driven simultaneously and at like speeds by means of the motor 202. Other suitable driving mechanism may also be provided.

A discharge chute 206 may be provided in proximity to the drum or roll 187 when the latter is in inoperative position, this chute serving to receive the pipe covers 180 after they have been interfelted and direct them to a drying oven 207. The drying oven may be similar in design to that illustrated in Fig. 2.

In operating this device, the belts 183 and 184 are initially in inoperative position shown in dotted outline. During this period the belt 183 is preferably permitted to rotate at a low speed in order to assist the introduction of a pipe roll 181 onto the portion of the belt 183 interjacent the rolls or drums 186 and 187. The frames 189 and 197 are then moved into operative position whereby the belts 183 and 184 together cover the major portion of the periphery or outer surface of the pipe cover 181. The frames 189 and 197 are drawn up to render the belts 183 and 184 moderately taut and then the surface speed of each of the belts is increased, whereby the pipe cover 181 is rotated at a relatively high speed. Small portions of the pipe cover remain uncovered where small nodes or swellings 209 are produced.

The degree of spinning and the speed of spinning may be similar to that indicated hereinbefore in connection with the embodiment illustrated in Fig. 2. After sufficient rotating, the belt speed is reduced and the belts parted to inoperative position, whereby the interfelted pipe roll 181 is permitted to pass onto the chute 206 where it is directed into the oven or drier 207.

The centrifuging operation of the coacting belts 183 and 184 performs the functions of distributing the binder solution uniformly over the glass wool fibers, particularly at their points of intersection, and throwing out centrifugally the excess binder solution. Enough binder is permitted to remain, however, to produce a strong, flexible mass, this amount having been found to be about 2 or 3% of the weight of the fibrous glass, according, however, to the type of binder and the degree to which it is desired to stiffen the mat.

The centrifuging operation performs a further function of interfelting the juxtaposed layers of glass wool mat. The nodes 209 which travel around the pipe cover cause the concentric layers of felted mat to advance relative to one another and cause the fibers thereof to interweave and intermat with one another, whereby the strength and mass integrity of the mat are materially increased.

Figure 6:
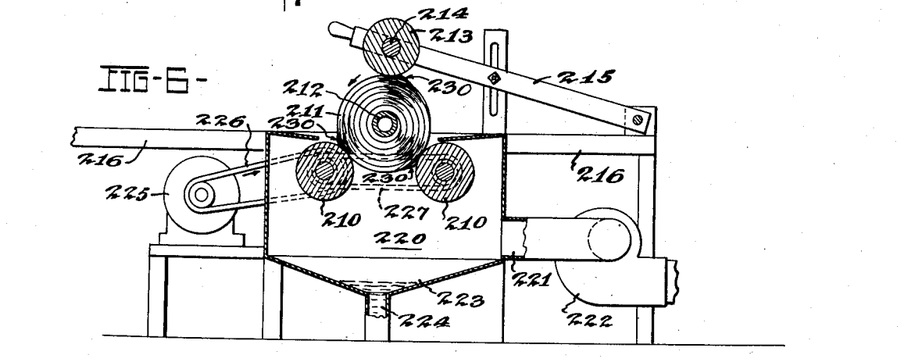
Fig. 6 is a diagrammatic section view of a still further modification of an interfelting means for cylindrical masses.

Referring more particularly now to Fig. 6, I have illustrated a further embodiment of the present invention adapted primarily to produce cylindrical pipe covers. In the drawings reference character 210 designates two parallel spaced apart rolls on and between which rests a cylindrical pipe cover 211. The pipe cover 211 may be formed in a manner similar to that disclosed in the other embodiments and may consist of a mat of glass wool wound spirally upon a mandrel 212 to which has been applied a sufficiency of relatively dilute binder.

Arranged in longitudinal contact over the pipe cover 211 and serving to maintain it in position under a predetermined pressure is an idler roll 213. The roll 213 revolves upon a shaft 214 which is mounted at the extremities of supporting levers 215, one of these levers 215 being provided for each end of the shaft 214. The supporting levers 215 are pivoted to a frame or base 216 and may be held in position by means of locking means 217 or other suitable means.

The rolls 210 are contained in a vacuum chamber 220 adapted to cause a suction to be applied to the pipe cover 211 between the rolls 210. An outlet conduit 221 may be provided to the chamber 220 leading to a suction blower or other suitable means 222 which carries off the gases and creates a partial vacuum within the chamber 220. At the bottom of the chamber 220 is a trough 223 having a discharge outlet 224 capable of discharging the liquids or other materials which may collect at the base of the chamber 220.

Driving means such as a motor 225 may be mounted on the base 216 and connected with the rollers 210 through drive belt 226 and belt 227, the latter drive belt 227 interconnecting the two rollers 210.

The operation of the device illustrated in Fig. 6 is similar in certain respects to the other embodiments. At the start of the operation, the lever 215 is raised and a pipe roll cover 211 is placed between and on the rolls 210. It will be noted that the pipe cover 211 is placed between the rolls 210 in such a manner that the spirally wound mat upon the mandrel is permitted to wind more tightly upon the mandrel as it is being revolved.

The roll 213 is then lowered upon the pipe cover 211 whereby the pipe cover receives a localized pressure along three sections of its periphery. The motor 225 is then started which causes the roll 214 and the interjacent cover 211 to simultaneously revolve.

The rotation of the pipe cover 211 is preferably carried on at high speed whereby the excess binder solution is caused to move outwardly from the pipe cover by centrifugal force. A large portion of the binder is caused to be discharged into the chamber 220 where it passes off through the conduit 224. The vacuum induced in the chamber 220 by means of the blower 222 assists in the discharge of the excess binder into the chamber 220. This vacuum is preferably made sufficiently high to cause a substantial draft of air to be induced through the pipe cover between the rolls 210. In this manner not only is the excess binder caused to be discharged into the chamber 220 but also the draft of air causes the binder solution which remains to be gradually dried. Moreover, as brought out hereinabove, the movement of excess liquid assists the interfelting of the fibers, particularly the shorter ones.

The removal of the excess binder in this manner assures an even distribution of the binder throughout the mass of fibers, since there is no permanently lower point to which the excess binder may seep.

I have also found that the constant rolling action on the periphery of the pipe cover 211 during the rotation thereof, serves to produce a smooth, tough outer surface over which a somewhat larger amount of binder has been caused to accumulate and dry. The resulting product, therefore, is caused to have a very light density and yet have an outer surface which is extremely tough, flexible and strong.

A further important feature of this embodiment is the interfelting action resulting between the adjacent layers of the glass wool mat in the pipe cover 211, caused by the rolling action of the rolls 210 and 214. As the pipe cover 211 revolves, a small node 230 is formed in front of each of the rolls 210 and 213 where it makes contact with the cover 211. The node 230 extends along the length of the pipe cover 211 and rotates relative to and around the pipe cover 211. As a result, the outer layers of mat are caused to advance slightly relative to the inner layers as each node 230 passes thereover.

The successive passages of the node 230 around the pipe cover gradually causes an interfelting between the adjacent layers of the mat in the pipe cover, in the same manner as brought out hereinbefore, in connection with the other embodiments. Likewise, as brought out hereinabove, the presence of the binder throughout the mass of fibers in the cover 211 causes the adjacent fibers to be lubricated with respect to one another and thereby slip past one another during the interfelting action. I have found that this permits a more complete interfelting without causing the fibers to be broken up into shorter lengths, or the pipe cover otherwise destroyed. If, however, the predetermined degree of interfelting has taken place, the solvent for the binder may be dried or evaporated, leaving the binder remaining on the surface of the fibers and causing adjacent fibers to adhere to one another at their points of intersection. The degree of interfelting may be regulated by suitable collars, such as collars 137, illustrated in Fig. 3. The use of these collars also produces a more perfectly cylindrical outer contour for the pipe cover.

Figure 9:
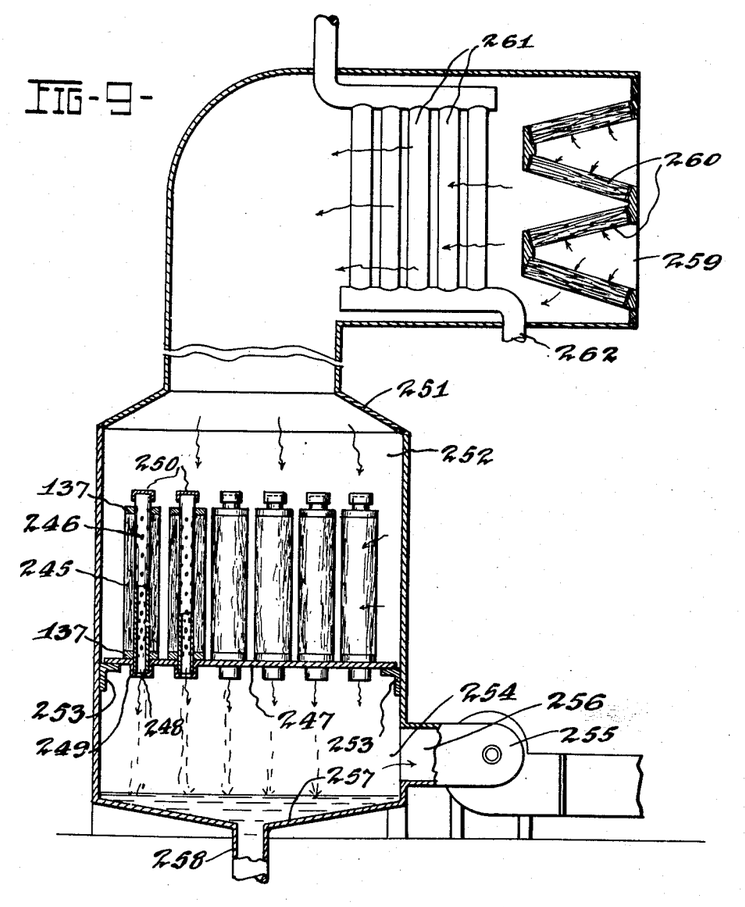
Fig. 9 is a diagrammatic sectional view of a modified embodiment of a drier for the glass wool mat.

Referring more particularly now to Fig. 9, I have illustrated a modified embodiment of the drier adapted to remove the excess binder solution and cause the residue to be evaporated and the adjacent fibers bonded together, principally at their points of intersection to form a flexible coherent mass. In the case of a resinous or other binder of the type adapted to become polymerized upon application of heat to the material on the mandrel, the drier just mentioned may be utilized to effect such polymerization.

After the pipe covers have been centrifuged or interfelted by any of the means illustrated in Figs. 1 to 7, the pipe covers 245 comprising a concentric mass of glass wool fibers around a perforated mandrel 246 are set in a vertical position on a movable plate 247. The collars 137, the same collars as shown in Fig. 3, may be left on the mandrels to assist the support of the fibrous mass and provide a more perfect air seal. The plate 247 is provided with a series of holes 248 through which the ends of the mandrel project. Thrust bearings or seats 249 are provided in register with each of the holes 248 in order to provide adequate support for the pipe covers 245.

As each pipe cover is inserted in its proper position upon the plate 247, a cap 250 is placed over the upper portion of the mandrel in order to provide a seal and prevent gases from entering into the upper end of the mandrel.

The plate 247 having a full quota of pipe covers 245 is then moved into a drying oven 251 in which place it is shown in Fig. 9. The drying oven comprises a chamber 252 having bearing seats 253 along the side walls thereof adapted to seat the plates 247 and form an air seal therewith. In inserting the plate 247 it may be slid over the bearing seats 253 into position.

The chamber 252 is thereby divided into two portions, the lower portion being a suction chamber 254 in which a vacuum of about 12 to 14 inches of water is preferably maintained.

In order to maintain the desired suction in the suction chamber 254, a blower 255 is provided to withdraw the gases through interconnecting conduits 256.

The lower portion of the suction chamber 254 may be shaped with downwardly converging side walls to provide a trough 257 leading into a discharge conduit 258 through which the accumulated liquids may be discharged and recovered.

The upper portion of the chamber 252 is provided with air inlet means 259 and an air filter 260 adapted to purify the incoming air and eliminate dust particles or other foreign matter. Mounted inwardly from the air filter 260 is a heater 261 through which the incoming gases or air flow and are heated to a suitably high temperature as, for example about 220° F., more or less, of course, as desired. The heater 261 may be heated by any suitable means such as electricity or steam, or the like. For this purpose a steam pipe 262 has been shown adapted to provide suitable amounts of steam.

In operating this device, it is preferable to permit the pipe covers 245 to drain for a short period of time with or without suction, say, about five minutes, in order to permit the first portion of the excess binder to seep down to the lower portion of the pipe cover and drain off to a certain extent. At the end of this initial draining period, there may be a concentration of liquid at the lower end of the pipe cover which may be in the neighborhood of 1000% of the weight of the wool and the liquid remaining at the top may be only about 125% of said weight. These figures, of course, are not critical and are only exemplary of the process more or less residual binder being possible according to the amounts and type of binder and the degree of interfelting and density of the glass wool used.

As the suction is then permitted to act upon the pipe cover, a large portion of the residual liquid drains off through the trough 257 where it may be recovered.

The suction emanating from the suction box 254 causes a large amount of air to pass directly through the interstices of the glass wool fibers of the pipe covers and cleans out to a high degree any residual binder remaining in the interstices of the fibers. The surface tension of the binder solution, however, causes a concentration of the binder to accumulate at the intersections of the fibers where it causes them to be bonded together.

Drying by means of this type of drier has been found to have several advantages. In the first place, the forced passage of air through the glass wool causes the drying operation to be carried out with great dispatch. For example, the complete drying of the covers may be accomplished in a relatively short period of time say, for example, about twenty to fifty minutes according, of course, to the degree of draft and the temperature of the air.

The forced passage of water and air radially through the pipe cover assists in the interfelting action of the fibers themselves and particularly the shorter fibers. The passage of the fluid through the cover in a direction transverse to the initial parallelism or inherent parallelism of the fibers, causes a large percentage of the fibers, and particularly the shorter fibers, to depart from the direction in which they have been left by the interfelting action and approach a more nearly radial direction. It will be noted that after they have been dried and bonded to the other fibers, they are in a position and arrangement whereby they may more readily and efficiently assist in increasing the strength of the pipe cover in radial directions.

The forced draft of fluid through the pipe cover also assists in distributing the binder over the surface of the fibers, particularly at the points of intersection of the fibers, and leaves a minimum amount of binder remaining throughout the pipe cover. For example, relatively small amounts of binder, such as 2 or 3, to 8 or 10% of binder, according to the type and weight of the binder itself, has been found sufficient to form a strong, flexible and coherent mass, and yet leave the interstices free and open and filled with dead air spaces.

It will be observed that the same type of drier embodying the idea of a forced draft through the mat may be provided for drying a planular mat of glass wool fibers such as the mats produced by means of the apparatuses illustrated in Figs. 1 to 6 of my co-pending application of which this is a division.

After the formation of the pipe cover by means of any of the processes illustrated herein, the mandrel may be removed and the cover 235, as illustrated in Fig. 8, may be slit longitudinally either completely in half or as shown partially therethrough by means of slit 236. With the partial cut as shown, a portion of the mat 237 remains holding the two halves together as by means of a hinge. I have found that my interfelted mass of superimposed layers or interfelted fibers is sufficiently flexible and bendable to permit the two halves to be opened and slipped over a pipe 239. The halves are then folded back over the pipe and the momentarily displaced fibers are caused to immediately resume their initial position.

A covering 240 of any suitable material such as canvas, paper, metal foil, paint, fabric, or the like, may be applied, as one skilled in the art would readily understand.

Modifications may be resorted to within the spirit and scope of the appended claims.

I claim:

1. The method of producing pipe covering from a thin mat of glass wool fibers which comprises rolling said mat spirally upon itself over a mandrel to form an internally supported cylindrical laminated mass of glass wool, applying localized pressure to the outer periphery of said cylindrical mass along the length of said mass and causing said pressure to advance circumferentially of the mass, thereby producing a node on said periphery, and causing said node to travel around said mass a sufficient number of times to cause adjacent layers of said mat to interfelt with one another.

2. The method of producing pipe covering from a thin mat of glass wool fibers which comprises rolling said mat spirally upon itself over a mandrel, applying a dilute solution of a binder to said rolled mat, applying localized pressure to the outer periphery of said cover along the length of said cover and causing said pressure to advance circumferentially of the covering, and thereby producing a node on said periphery, causing said node to travel around said pipe cover and thereby causing adjacent layers of said mat to interfelt with one another, and then drying said solution of binder to cause adjacent fibers to be bonded together at their points of intersection.

3. The method of forming a pipe cover from a mat of glass wool fibers which comprises rolling said mat upon itself over a mandrel, applying a lubricant to the fibers of said mat, and then centrifuging said rolled mat thereby causing fibers of adjacent layers of said mat to interfelt with one another.

4. The method of producing a coherent mass of glass fibers from a thin mat of glass wool fibers lying predominantly parallel to the surface of said mat, which comprises rolling said mat upon itself to form a spirally wound cylindrical mass, applying a liquid to said mass, and then causing the rapid movement of said liquid by which it is removed from the fiber mass and by said movement causes said fibers to partially depart from their original position, thereby causing them to interfelt with one another.

5. The method of forming a pipe cover which comprises forming a web of glass wool fibers, rolling said web upon itself over a mandrel, drenching said fibers with a liquid, applying localized pressure to said rolled web at an outer surface thereof, and then spinning said web with relation to said localized pressure and thereby causing said localized pressure to travel around the surface of said rolled web and causing the excess of said liquid to be centrifuged from said rolled web, said spinning action causing an interfelting of said fibers and thereby increasing the mass integrity and strength of said cover.

6. The method of forming a pipe cover which comprises forming a web of glass wool fibers, rolling said web upon itself over a mandrel, drenching said fibers with a liquid, applying localized pressure to said rolled web at an outer surface thereof, then spinning said web with relation to said localized pressure and thereby causing said localized pressure to travel around the surface of said rolled web and causing the excess of said liquid to be centrifuged from said rolled web, said spinning action causing an interfelting of said fibers and thereby increasing the mass integrity and strength of said cover, and evaporating the remaining liquid.

7. The method of forming a pipe cover which comprises rolling a web of glass wool fibers which have been coated with a bonding agent, applying localized pressure to the rolled web at an outer surface thereof, and spinning the rolled web with relation to the localized pressure and thereby causing said localized pressure to travel around the surface of the rolled web to cause an interfelting of said fibers and thereby increasing the mass integrity and strength of the thus formed cover.

8. The method of producing a coherent cylindrical mass of glass fibers from a mat of glass fibers which lie predominantly parallel to the major surfaces of said mat, which comprises rolling said mat upon itself to form a spirally wound cylindrical mass, drenching said mass with a liquid, and then compressing the drenched mass about a major part of its circumference and rotating the mass about a lengthwise axis while maintaining compression thereon, thereby centrifuging said cylindrical mass to cause the rapid movement of said liquid through the fiber mass and cause said fibers to partially depart from their original position and interfelt with one another.

9. The method of producing a coherent cylindrical mass of glass fibers from a mat of glass fibers which lie predominantly parallel to the major surfaces of said mat, which comprises rolling said mat upon itself to form a spirally wound cylindrical mass, drenching said mass with a liquid, centrifuging said cylindrical mass and simultaneously passing a draft of gaseous medium therethrough to cause the rapid movement of said liquid through the fiber mass and by said movement cause said fibers to partially depart from their original position and interfelt with one another.

10. The method of producing a coherent cylindrical mass of glass fibers from a mat of glass fibers lying predominantly parallel to the major surfaces of said mat which comprises rolling said mat upon itself to form a spirally wound cylindrical mass, applying a liquid to said mass, centrifuging said cylindrical mass to cause the rapid movement of said liquid through the fiber mass and by said movement cause said fibers to partially depart from their original position and interfelt with one another, and then passing a draft of gaseous medium through said mass to remove residual liquid and dry said mass.

11. The method of producing a coherent mass of glass fibers from a loose mat of glass wool, which comprises rolling said mat upon itself to form a cylindrical laminated mass, applying a liquid to said mass, compressing said mass over all but a lengthwise extending minor portion of its circumference and then causing rapid spinning movement of said mass while maintaining the position of said uncompressed portion stationary, whereby to cause said liquid to be moved radially outwardly from the center and the excess removed from the mass and the fibers of adjoining layers of said mass to partially depart from their original position and to interfelt with one another.

12. The method of producing pipe covering from a mat of glass wool fibers which comprises rolling said mat spirally upon itself over a mandrel to form an internally supported cylindrical mass of glass wool, compressing said mass about the greater portion of its periphery and leaving the mass uncompressed at least at one portion in the neighborhood of a line extending lengthwise of the mass, and causing said uncompressed portion of said mass to move circumferentially of said mass and thereby cause the fibers of adjacent layers of said mass to interfelt with one another.

13. The method of producing pipe covering from a mat of glass wool fibers which comprises rolling said mat spirally upon itself over a mandrel to form a cylindrical laminated mass of glass wool, compressing said mass about the greater portion of its periphery by enclosing said mass in an open loop of a flexible belt so that the major portion of the circumference of the mass is surrounded and compressed by the belt, and a portion of the circumference of the mass corresponding to the opening in the loop is uncompressed, and rotating said mass about a central axis lengthwise of said mass by causing said belt to move parallel with its surface, whereby the uncompressed portion of said mass moves circumferentially over said mass to cause fibers of adjacent layers of the mass to interfelt with one another.

14. The method of producing pipe covering from a mat of glass wool fibers which comprises rolling said mat spirally upon itself over a mandrel to form a cylindrical laminated mass of glass wool, compressing said mass about the greater portion of its periphery by disposing said mass between parallelly related coacting belts so that the mass is surrounded and compressed by said belts over substantial and diametrically opposed portions of its circumference and uncompressed in the spaces between the belts, rotating said mass about a central axis lengthwise of the mass by causing said belts to move parallel with their repective surfaces, thereby causing said uncompressed portions to move circumferentially relative to said mass to cause fibers of adjacent layers of said mass to interfelt with one another.

GAMES SLAYTER.